United States Patent [19]

Braun et al.

[11] Patent Number: 4,809,296
[45] Date of Patent: Feb. 28, 1989

[54] METHOD FOR TRANSMITTING DATA VIA THE LINES OF A POWER SUPPLY SYSTEM

[75] Inventors: Walter Braun, Wettingen; Walter Hagmann, Dättwil, both of Switzerland

[73] Assignee: BBC Brown, Boveri Ltd., Baden, Switzerland

[21] Appl. No.: 13,554

[22] Filed: Feb. 11, 1987

[30] Foreign Application Priority Data

Feb. 27, 1986 [DE] Fed. Rep. of Germany ....... 3606354

[51] Int. Cl.⁴ ............................................. H04B 15/00
[52] U.S. Cl. ........................................ 375/1; 375/100; 340/310 R
[58] Field of Search ...................... 375/1, 100, 115, 40, 375/45, 51, 82; 455/63, 65; 340/310 R

[56] References Cited

U.S. PATENT DOCUMENTS

| | | | |
|---|---|---|---|
| 4,128,809 | 12/1978 | Kagie | 375/100 |
| 4,432,094 | 2/1984 | Das Gupta | 375/102 |
| 4,455,651 | 6/1984 | Baran | 455/13 |
| 4,468,792 | 8/1984 | Baker | 375/1 |
| 4,583,231 | 4/1986 | Puckette | 375/51 |
| 4,596,024 | 6/1986 | Thomson | 375/100 |
| 4,597,087 | 6/1986 | Kadin | 375/115 |
| 4,606,041 | 8/1986 | Kadin | 375/40 |
| 4,616,364 | 10/1986 | Lee | 375/100 |
| 4,621,368 | 11/1986 | Onoe et al. | 375/100 |

FOREIGN PATENT DOCUMENTS

| | | |
|---|---|---|
| 0118234 | 12/1984 | European Pat. Off. . |
| 1958727 | 5/1971 | Fed. Rep. of Germany . |
| 2545985 | 6/1976 | Fed. Rep. of Germany . |
| 2519410 | 8/1976 | Fed. Rep. of Germany . |
| 2650431 | 5/1977 | Fed. Rep. of Germany . |
| 2936929 | 4/1981 | Fed. Rep. of Germany . |
| 2640756 | 11/1982 | Fed. Rep. of Germany . |
| 3127947 | 1/1983 | Fed. Rep. of Germany . |
| 2091460 | 7/1982 | United Kingdom . |

Primary Examiner—Robert L. Griffin
Assistant Examiner—Stephen Chin
Attorney, Agent, or Firm—Oblon, Fisher, Spivak, McClelland & Maier

[57] ABSTRACT

A method for transmitting data via the power system line of a power supply system by carrier frequency modulation, wherein an improvement in the reliability of transmission is achieved by transmitting the same information several times in succession (time diversity) of different carrier frequencies (frequency diversity). Additional coding of the data by a "forward error correction code" results in further improvement.

6 Claims, 3 Drawing Sheets

METHOD FOR TRANSMITTING DATA VIA THE LINES OF A POWER SUPPLY SYSTEM

BACKGROUND OF THE INVENTION

1. Field of the Invention

The present invention relates to a method for transmitting data via the lines of a power supply system, such as is known, for example, from U.S. Pat. No. 4,012,734.

2. Discussion of Background

The exchange of data between various stations via a power distribution system is gaining increasing significance. Thus, for example, there are efforts by the power supply utilities to optimize the system utilization by direct control or interrogation of ultimate consumers.

Such an exchange of data must take into consideration the communication engineering facts associated with the power supply system in its characteristic as communication channel. Thus, disturbances in the transmission become effective at the low- and medium voltage level of the system which are attributable to time-and-frequency selective fading phenomena and to the noise characteristics of the channel. The result of these disturbances is that conventional transmission methods using the power supply system as communication channel only display a restricted availability of the communication link.

SUMMARY OF THE INVENTION

The present invention has the object of specifying a method for data transmission via a power supply system which is distinguished by improved availability of the communication link created in this manner.

In a method of the type initially mentioned, the object is achieved by method for transmitting data via the lines of a power supply system, particularly at the low- and medium-voltage level, in which a carrier frequency is modulated with the data and is transmitted, wherein the same information in the form of symbols (A, ..., F) is transmitted several times at different times and by means of different carrier frequencies in order to reduce the error rate during transmission.

The core of the invention can be seen in the fact that the disturbances of the power supply system and in particular the time-and-frequency selective fading phenomena are, if not neutralized, then at least distinctly repressed in their influence on communication transmission by multiple transmission of each information with respect to time (time diversity) and with respect to the carrier frequency (frequency diversity).

Thus, if, for example, an information item is transmitted in-correctly or mutilated in its first transmission on a first carrier frequency by a disturbance occurring at this time in this frequency range, there is a great probability that the same information item is not again subjected to a disturbance during a later repeated transmission on another carrier frequency.

Phase shift keying (PSK) is preferably used as modulation type for the proposed method and is combined with a pseudo-random abrupt change in carrier frequency during transmission in the manner of the frequency hopping (FH) method known per se (FH/PSK). The phase-shift-keyed signal received is then coherently detected by a special method, in spite of the pseudo-randomly changing carrier frequency.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
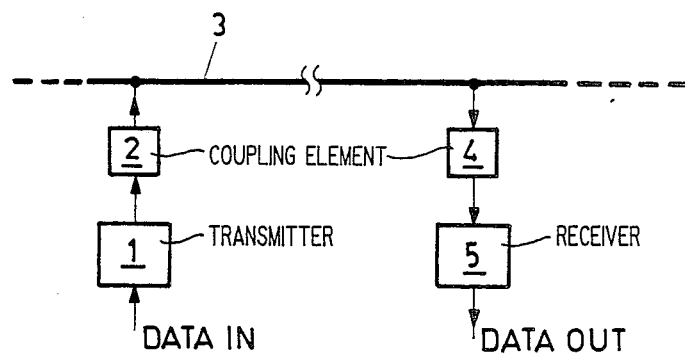
FIG. 1 is a schematic block diagram showing a transmission system for carrying out the method according to the invention, comprising a transmitter and a receiver.

Referring now to the drawings, wherein like reference numerals designate identical or corresponding parts throughout the several views, FIG. 1 shows the basic diagrammatic arrangement for a transmission system such as is used for carrying out the method according to the invention.

The data to be transmitted reach the data input of a transmitter 1 where they are modulated onto a suitable carrier frequency and are passed via a first coupling element 2, for example a coupling capacitor, to a power system line 3 of a power supply system. The power system line 3 can be a part of the low- or medium-voltage level of the power supply system but can just as well extend partially in the low-voltage level and partially in the medium-voltage level. For the sake of simplicity, the substations and transformers existing in the above-mentioned case have not been drawn in the Figure.

The modulated carrier frequency is transmitted via the power system line 3 to a receiver 5 which is coupled to the power system line 3 by a second coupling element 4. In the receiver 5, the data are recovered by demodulation of the received signal and are available for further processing at a data output.

Figure 2:
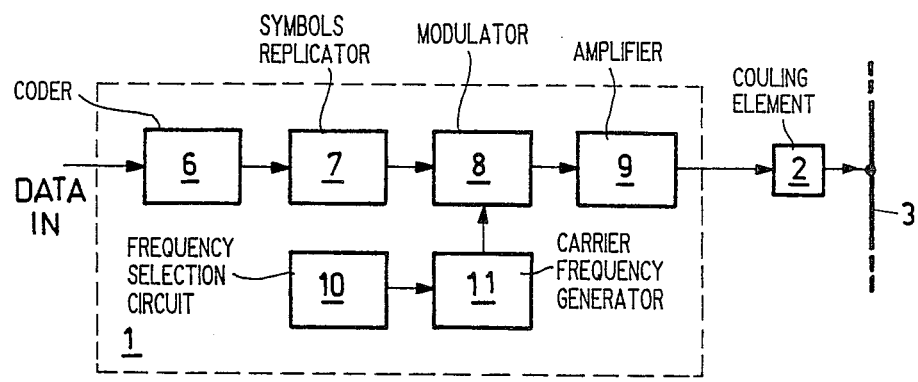
FIG. 2 is a block diagram showing the internal configuration of a transmitter according to FIG. 1 for a preferred embodiment of the method.

The internal configuration of the transmitter 1 of FIG. 1 such as is suitable for a preferred embodiment of the method is shown in FIG. 2, identical parts being provided with the identical reference characters.

Within the transmitter 1, the data to be transmitted are first supplied to a coder 6 which preferably operates with a "forward error correction code". Details on the code and the coder can be found, for example, in the book by W. Peterson and E. Weldon, "Error correcting codes", MIT Press, Cambridge, U.S.A., 1972.

The symbols produced during the coding of the data are subsequently duplicated in a symbol replicator 7 as many times as the symbol is to be transmitted. If, according to a preferred embodiment of the method, each information item is in each case transmitted twice, two identical symbols are generated from each incoming symbol in the symbol replicator 7.

The symbols and their respective replicas which, initially, directly follow each other, are repositioned in the symbol replicator 7 in such a manner that symbols previously located directly adjacently to each other are now far distant from each other. This rearrangement of the symbols can be produced, for example, by reading the symbols row by row into the matrix of a two-dimensional memory and subsequently reading them out again column by column. Another especially preferred type of rearrangement is used in a particular type of multiple transmission and explained later in conjunction with FIG. 3.

The rearranged symbols pass from the symbol replicator 7 to a modulator 8 where they are modulated onto the carrier frequency or onto a sequence of changing carrier frequencies. In this arrangement, the carrier frequencies jump to a different value, preferably according to the known FH method, in each case after transmission of a particular number of symbols, a so-called block. The assumed carrier frequency values are selected pseudo-randomly.

This hopping of the carrier frequency is implemented by a carrier frequency generator 11 which generates the carrier frequency under control of a pseudo-randomly operating frequency selection circuit 10. The frequency selection circuit 10 not only specifies the carrier frequency value for the carrier frequency generator 11 but, at the same time, ensures that a new carrier frequency is generated as soon as a block of symbols with a predefined block length has been transmitted.

The modulator 8 is preferably a PSK modulator with m permitted phase values (m-PSK), in particular a BPSK modulator (PBSK=Binary PSK) which keys the carrier frequency between two permitted phase values as a function of the symbols.

The modulated signal is finally applied to a subsequent power amplifier 9 where it is amplified and then coupled into the power system line 3 via the coupling element 2.

As already indicated above, the repositioning or rearranging of the symbol sequence in the symbol replicator 7 can be done by suitably reading them in and out of a two-dimensional memory. However, a special type of rearrangement is required when, in accordance with a preferred embodiment of the method, the multiple transmission of the information item is performed in a FH/PSK method of a special design in order to enable carrier synchronization, and thus coherent demodulation of the received signal, to be achieved.

Such a FH/PSK method is the subject-matter of U.S. patent application Ser. No. 06/881,235. In this method, symbols A, ..., F, are combined in blocks I, ..., IV of 3 symbols length each which are in each case transmitted with a carrier frequency $f_I, \ldots, f_{IV}$ associated with the block, and as shown in an example in FIG. 3.

Each of the symbols A, ..., F is transmitted twice in different blocks. The symbol sequence is rearranged in such a manner that each pair of symbols (for example AB, BC, BD and so forth) occurs only once in one block. At the same time, this rule establishes the manner of operation of the symbol replicator 7 from FIG. 2.

Although unpredictable phase changes occur between the symbol blocks due to the hopping of the carrier frequency, synchronization and thus coherent demodulation in the receiver is possible with this filed method of multiple transmission.

For this purpose, a mean block phase is first determined for each block by averaging over all symbol phases of a block. In m-PSK modulation with m equidistant permitted phase values, this is done by first multiplying all symbol phases by the factor m by transformation and then averaging over the transformed symbol phases. The mean block phase thus obtained is m times (twice in the BPSK method) degenerate, that is to say the same mean block phase is assigned to m different actual block phases.

The synchronization information located in the multiple transmission of each symbol is utilized, and obtained from the received signal with the aid of a special algorithm via a system of equations, in order to eliminate this m-fold uncertainty and to be able to uniquely define the relative phase relationships between the blocks.

At the same time, the special type of the preferred FH/PSK method affects the internal configuration of the receiver 5 from FIG. 1. This internal configuration is reproduced in FIG. 4.

The received signal is picked up from the power system line 3 via the coupling element 4, separated from other disturbing frequencies in a filter 12 and preamplified in an amplifier 13 having an adjustable gain factor.

The amplifier 13 is followed by a frequency hopper circuit (dehopper) 14 in which the received signal with its changing carrier frequencies is converted into a signal having a constant intermediate frequency. For this purpose, the dehopper 14 must be supplied with frequencies which change in the same manner as the carrier frequencies generated at the transmitter. This is done by having in a frequency selection circuit 18 in the receiver all information, for example by prior transmission, to be able to generate the same pseudo-random frequency sequence as in the transmitter.

At the beginning of a data transmission, a synchronization switch circuit 19 determines by means of a suitable search strategy the location of the carrier frequency sequence at which the system is located and then synchronizes the frequency selection circuit 18 in the receiver with the frequency selection circuit 10 in the transmitter.

The frequency selection circuit 18 in the receiver then controls a carrier frequency generator 17 in the receiver in the same manner as in the transmitter 1.

At the output of the dehopper 14, a phase-shift-keyed signal with a constant intermediate frequency is available which is split into its two quadrature branches in a subsequent quadrature demodulator 15. The internal configuration of a suitable quadrature demodulator 15 is shown in an illustrative embodiment in FIG. 5.

Figure 4:
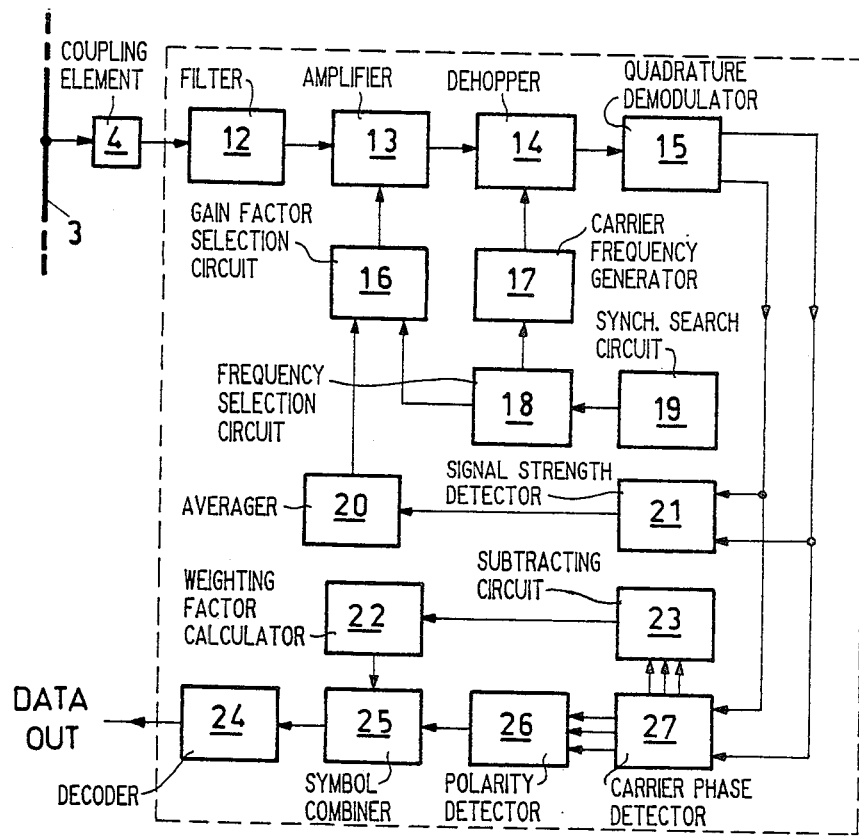
FIG. 4 is a schematic block diagram illustrating the internal configuration of a receiver according to FIG. 1 in a design which is adapted to the transmitter of FIG. 2.
Figure 5:
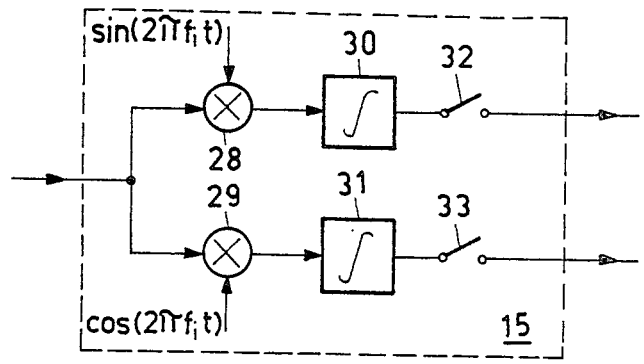
FIG. 5 is a block diagram showing the internal configuration of a quadrature demodulator for the receiver of FIG. 4.

In the quadrature demodulator of FIG. 5, the incoming phase-shift-keyed signal with its constant intermediate frequency, to be called $f_i$ in this case, is in each case multiplied by a quantity proportional to $\sin(2\pi f_{it})$ and a quantity proportional to $\cos(2\pi f_{it})$ by means of two multipliers 28 and 29. The alternating-voltage components are filtered out of the resultant product signals in two subsequent integrators 30 and 31. The resultant direct-voltage signals, which correspond to the components of the received-signal vector in the two-dimensional phase plane are then sampled by two samplers 32 and 33, in each case at the optimum sampling time within each symbol interval. The sampled values are finally supplied to other circuit sections of FIG. 4 for further processing.

On the one hand, the sampled values of the two quadrature branches are supplied to the input of a signal strength detector 21 which determines from these values a quantity which corresponds to the strength of the signal received. Such a signal strength determination can be implemented, for example, by means of a circuit arrangement such as is reproduced in FIG. 8.

Figure 8:
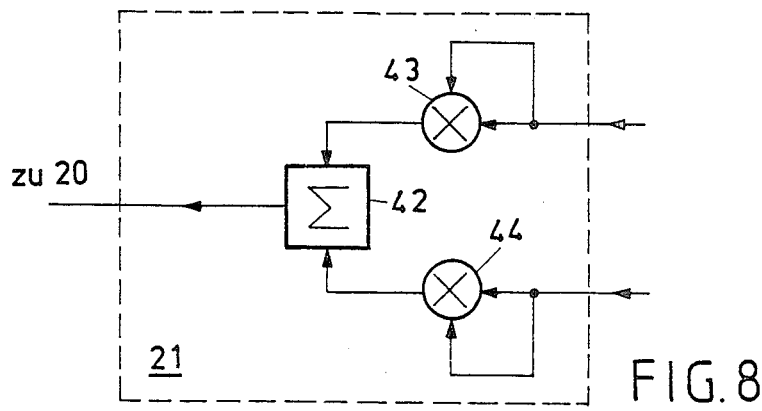
FIG. 8 is a block diagram showing the internal configuration of a signal strength detector for a receiver according to FIG. 4.

In the arrangement of FIG. 8, the sampled values are in each case squared in two further multipliers 43 and 44 and the squared sample values of both quadrature branches are added together for each block of symbols, that is to say for each interval having a uniform carrier frequency, in an adding circuit 42.

The result of the summation is passed from the signal strength detector 21 to an averaging circuit 20 which determines the mean signal strength for each carrier frequency, that is to say for each symbol block. This quantity is then used for optimally setting the gain factor of the amplifier 13 for each frequency via a gain factor selection circuit 16. This takes account of the transmission conditions in the channel which change with frequency.

On the other hand, the sampled values of the quadrature branches in the circuit of FIG. 4 reach the input of a carrier phase detector 27 which determines the previously mentioned mean block phase from the values for each block of symbols.

Figure 6:
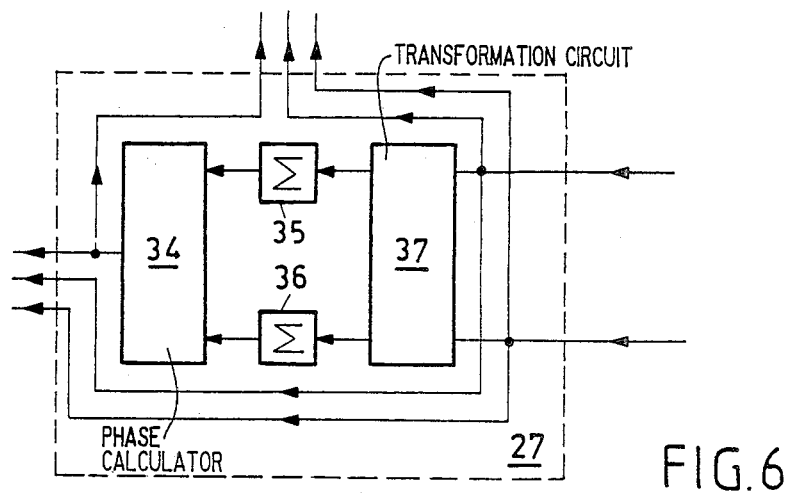
FIG. 6 is a block diagram showing the internal configuration of a carrier phase detector for the receiver of FIG. 4.

For determining the mean block phase, a circuit configuration according to FIG. 6 is suitable which, together with the arrangement of FIG. 5, forms a non-linear feedback-free phase estimator such as is known from the article by A. J. Viterbi and A. M. Viterbi, "Nonlinear Estimation of PSK-Modulated Carrier Phase with Application to Burst Digital Transmission", IEEE Transactions on Information Theory, Vol. IT-29, No. 4, July 1983, S. 543 ff.

In the arrangement of FIG. 6, the sampled values of the quadrature branches are first subjected, in a transformation circuit 37, to a nonlinear transformation which results in a multiplication of the symbol phase of the sampled signal by a factor m which is equal to the number of the permitted phase values (this generally applies to m-PSK modulation; the phase is doubled for BPSK).

Accordingly, the transformation in the transformation circuit 37 maps the m permitted equidistant phase values onto an m-fold degenerate phase value. The symbol phases actually measured and deviating from the m permitted phase values are correspondingly scattered around an m-fold degenerate mean value after the transformation. This m-fold degenerate mean value is equal to the mean block phase if averaging is done over all symbol phases of a block.

The mean block phase is determined by adding together the transformed sampled values in two adders 35 and 36. From the sums formed, a phase calculator 34 then calculates in known manner by applying the inverse tangent function the mean phase of a block which, in turn, is m-fold degenerate and thus has an m-fold equivocation. As already previously mentioned, the equivocation can be eliminated by means of a multiple transmission of the symbols by means of the method which is the subject-matter of Swiss Patent Application No. 3068/85-1.

The mean block phase present at the output of the phase calculator 34 of FIG. 6, together with the sampled values, passes for furhter processing, on the one hand, to a subtracting circuit 23 and, on the other hand, to a polarity detector 26 (FIG. 4).

The subtracting circuit 23, in collaboration with a weighting factor calculator 22, determines for each symbol transferred a quantity which includes, on the one hand, the signal strength and, on the other hand, the strength of any disturbances and which is allocated to each symbol in the form of a weighting factor as a measure of the reliability of the symbol information.

This is preferably done by first forming the difference between the actual symbol phase and the mean block phase for each sampled symbol in the subtracting circuit 23:

$$\Delta\rho_{ik} = |\rho_{ik} - \bar{p_i}/51, \quad i,k = 1, 2, 3, \ldots \quad (1)$$

$\rho_{ik}$ = Phase of the kth symbol in the ith block,
$\Delta\rho_{ik}$ = Phase difference for kth symbol in ith block,
$\bar{p_i}$ = Mean block phase of ith block.

From the phase difference $\Delta\rho_{ik}$, a weighting factor $W_{ik}$ is then determined in each case in the weighting factor calculator 22 by application of a function, which weighting factor has the following characteristics:

$$W_{ik} = \infty, \text{ if } \frac{m}{2} \cdot \Delta\phi_{ik} \bmod \pi = 0 \quad (2)$$

$$(m - PSK)$$

$$W_{ik} = 0, \text{ if } \frac{m}{2} \cdot \Delta\phi_{ik} \bmod \pi = \frac{\pi}{2}$$

The function $f(x) = 1/\tan(x)$ is here used in preference to obtain the corresponding weighting factor $W_{ik}$ from $\Delta\rho_{ik}$.

In addition to determining the weighting factors $W_{ik}$, the mean block phase and the sampled values from the carrier phase detector are also used for eliminating the still existing m-fold phase uncertainty in the subsequent polarity detector 26. For m=2, that is to say in the BPSK method, the mean block phase has an ambiguity with two phase values which are displaced by 180° with respect to each other so that both values can be transformed into each other by just changing the sign. In the PSK method, elimination of the equivocation is therefore equivalent to a determination of sign. Since it is the BPSK modulation which is used preferably for the present method, the circuit 26 for eliminating the ambiguity is therefore called polarity detector in short.

Having uniquely defined the relative phase relationship between the blocks and the symbol phases by means of the polarity detector 26 by the method described in the Swiss patent application, the associated symbol values are combined with each other in a symbol combiner 25 by using the weighting factors calculated in 22, in each case for each symbol transmitted several times, the symbol which has been transmitted with great disturbance in its block and the reliability of which is therefore low being assigned, with the aid of the weighting factor, a low weight in the combination.

Figure 3:
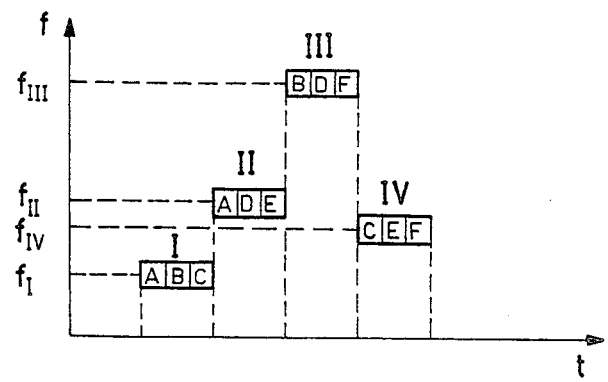
FIG. 3 is a graph showing an illustration of multiple transmission with time and frequency diversity in a frequency/time diagram.
Figure 7:
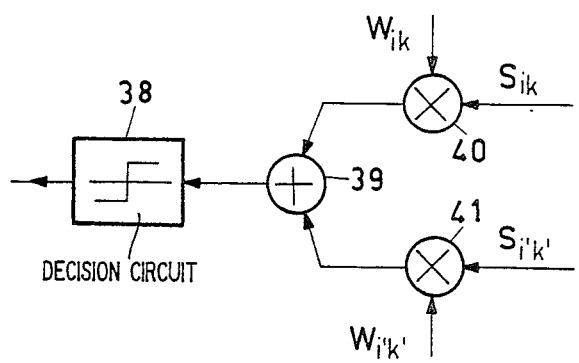
FIG. 7 is a block diagram showing a diagrammatic arrangement for the combination of weighted symbols transmitted several times.

The operation of combining the symbols representing the same information is diagrammatically illustrated in FIG. 7. The values $S_{ik}$ and $S_{i'k'}$ of corresponding symbols from different blocks, for example of symbol B from block I and III in FIG. 3 are multiplied by the weighting factors $W_{ik}$ and $W_{i'k'}$ determined for them in two multipliers 40 and 41 and are then combined in an adder 39. The result is finally supplied to a decision circuit 38 which, for example, makes a threshold decision (for m=2) to obtain the final decision on the information bit values.

At the output, finally, a decoder 24 is provided in the receiver 5 which reconverts the data coded with the "forward error correction code" back into uncoded data. Although the transmission according to the method according to the invention entails considerable improvements in availability even without additional coding, the error rate is nevertheless further reduced by using such a code. This is why both the coder 6 from FIG. 2 and the corresponding decoder 24 from FIG. 4 are preferably used in the execution of the method.

Finally, it must still be mentioned that the gain factor selection circuit 16, whose method of actuation by the value of the signal strength from the averager 20 has already been described, can also use information items from the frequency selection circuit 18 to effect, in dependence on the frequency selected there, a certain preselection of the gain factor independently of the actual signal strength.

Overall, the method according to the invention provides a method for data transmission in power supply systems in which the influence of the system-specific disturbances on the transmission is distinctly reduced.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Method for transmitting data via the lines of a power supply system, particularly at low- and medium-voltage level, comprising the following steps:

encoding data to be transmitted into the form of symbols (A, . . . , F) by applying a forward error correction code;

duplicating each one of said symbols (A, . . . F) a given number of times;

rearranging said duplicated symbols (A, . . . F) so that symbols previously located directly adjacently to each other are then a far distance from each other;

combining said rearranged symbols into blocks so that each symbol is at least in two different blocks;

transmitting said blocks by means of different carrier frequencies in order to reduce the error rate during transmission;

wherein the different carrier frequencies are modulated by means of phase shift keying.

2. Method as claimed in claim 1, wherein phase shift keying with two permitted values (BPSK=Binary Phase Shift Keying) is used.

3. Method as claimed in claim 1, wherein the carrier frequency is abruptly and pseudo-randomly changed in the manner of frequency hopping (FH) method in each case after the transmission of a particular number of symbols (A, . . . F).

4. Method as claimed in claim 2, wherein each symbol (A, . . . F) is transmitted twice.

5. Method as claimed in claim 1, wherein, at the receiver, each symbol (A, . . . F) is assigned a weighting factor having the following characteristics $$W_{ik} = \infty \text{ if } \frac{m}{2} \cdot \Delta\phi_{ik} \mod \pi = 0$$
$$(m - PSK)$$
$$W_{ik} = 0 \text{ if } \frac{m}{2} \cdot \Delta\phi_{ik} \mod \pi = \frac{\pi}{2}$$

where $\Delta\phi_{ik}$ is the difference between an actual symbol phase $\phi_{ik}$ and a mean block phase of each symbol and symbols representing the same information due to the multiple transmission are combined with each other using the weighting factors ($W_{ik}$).

6. Method as claimed in claim 5, wherein the weighting factors are obtained by applying the function $f(x)=1/\tan(x)$.

* * * * *